US010604103B2

(12) United States Patent
Lee et al.

(10) Patent No.: US 10,604,103 B2
(45) Date of Patent: Mar. 31, 2020

(54) ROOF AIRBAG APPARATUS

(71) Applicant: Hyundai Mobis Co., Ltd., Seoul (KR)

(72) Inventors: Seok Min Lee, Yongin-si (KR); Byung Ho Min, Seoul (KR); Hae Kwon Park, Yongin-si (KR); Kyu Sang Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 150 days.

(21) Appl. No.: 15/838,260

(22) Filed: Dec. 11, 2017

(65) Prior Publication Data

US 2018/0162314 A1    Jun. 14, 2018

(30) Foreign Application Priority Data

Dec. 12, 2016 (KR) .......................... 10-2016-0168988

(51) Int. Cl.
*B60R 21/213* (2011.01)
*B60R 21/233* (2006.01)
*B60R 21/2338* (2011.01)

(52) U.S. Cl.
CPC .......... *B60R 21/233* (2013.01); *B60R 21/213* (2013.01); *B60R 21/2338* (2013.01); *B60R 2021/23324* (2013.01); *B60R 2021/23388* (2013.01)

(58) Field of Classification Search
CPC ... B60R 21/213; B60R 21/214; B60R 21/215; B60R 21/2338; B60R 2021/23192; B60R 2021/23386; B60R 2021/23388
See application file for complete search history.

(56) References Cited

U.S. PATENT DOCUMENTS

| 6,070,902 | A  | * | 6/2000 | Kowalski | ............ | B60R 13/0225 |
| | | | | | | 280/730.2 |
| 6,189,960 | B1 | * | 2/2001 | Mumura | ................ | B60J 7/0015 |
| | | | | | | 160/7 |
| 6,749,216 | B2 | | 6/2004 | Tanase et al. | | |
| 6,783,174 | B2 | * | 8/2004 | Bohm | .................... | B60J 7/0573 |
| | | | | | | 296/223 |
| 6,817,626 | B2 | * | 11/2004 | Boll | ...................... | B60R 21/213 |
| | | | | | | 280/730.1 |

(Continued)

FOREIGN PATENT DOCUMENTS

| DE | 100 39 803 | 2/2002 |
| KR | 10-2003-0063738 | 7/2003 |
| KR | 10-1509771 | 4/2015 |

OTHER PUBLICATIONS

Non-Final Office Action dated May 17, 2019, issued in U.S. Appl. No. 15/838,174.

(Continued)

*Primary Examiner* — Barry Gooden, Jr.
(74) *Attorney, Agent, or Firm* — H.C. Park & Associates, PLC

(57) ABSTRACT

In an embodiment, a roof airbag apparatus may include: a roof airbag cushion connected to an inflator, the roof airbag cushion configured to be disposed in a first folded state in a panorama roof, and to be inflated in a second expanded state and deployed as gas is supplied from the inflator; and a constraint connected to the roof airbag cushion configured to pull downward a distal end portion of the roof airbag cushion as it is being inflated to prevent reverse deployment of the roof airbag cushion.

11 Claims, 8 Drawing Sheets

(56) References Cited

U.S. PATENT DOCUMENTS

| | | | |
|---|---|---|---|
| 7,712,773 B2 | 5/2010 | Walston | |
| 8,459,696 B2* | 6/2013 | Browne | B60R 21/08 |
| | | | 180/282 |
| 9,067,562 B2 | 6/2015 | Nakashima | |
| 9,156,427 B2 | 10/2015 | Wang et al. | |
| 9,771,048 B2* | 9/2017 | Min | B60R 21/214 |
| 2001/0017459 A1* | 8/2001 | Fischer | B60R 21/232 |
| | | | 280/730.2 |
| 2002/0074775 A1 | 6/2002 | Ryan | |
| 2002/0074778 A1* | 6/2002 | Melia | B60R 21/201 |
| | | | 280/730.2 |
| 2002/0125690 A1 | 9/2002 | Boll et al. | |
| 2003/0168835 A1* | 9/2003 | Thomas | B60R 21/232 |
| | | | 280/730.2 |
| 2004/0066022 A1* | 4/2004 | Mori | B60N 2/42745 |
| | | | 280/730.1 |
| 2005/0046159 A1* | 3/2005 | Noguchi | B60R 21/232 |
| | | | 280/730.2 |
| 2005/0116450 A1* | 6/2005 | Noguchi | B60R 21/232 |
| | | | 280/730.2 |
| 2008/0012275 A1* | 1/2008 | Pinsenschaum | B60R 21/232 |
| | | | 280/730.2 |
| 2008/0150263 A1 | 6/2008 | Mizuno et al. | |
| 2011/0079990 A1* | 4/2011 | Cheal | B60R 21/213 |
| | | | 280/730.2 |
| 2014/0203541 A1 | 7/2014 | Wei et al. | |
| 2014/0217710 A1 | 8/2014 | Fukawatase et al. | |
| 2015/0115581 A1 | 4/2015 | Mazanek et al. | |
| 2016/0023626 A1 | 1/2016 | Hiruta et al. | |
| 2016/0200281 A1 | 7/2016 | Takeshita et al. | |
| 2016/0280178 A1 | 9/2016 | Kruse | |
| 2017/0015269 A1* | 1/2017 | Min | B60R 21/214 |
| 2017/0072896 A1 | 3/2017 | Fukawatase et al. | |
| 2017/0088083 A1 | 3/2017 | Haraiwa et al. | |
| 2018/0162313 A1* | 6/2018 | Lee | B60R 21/213 |
| 2018/0162314 A1 | 6/2018 | Lee et al. | |
| 2018/0162315 A1* | 6/2018 | Lee | B60R 21/2346 |
| 2018/0265029 A1* | 9/2018 | Min | B60R 21/233 |
| 2018/0312130 A1 | 11/2018 | Min et al. | |
| 2018/0326939 A1 | 11/2018 | Jung et al. | |
| 2019/0016292 A1* | 1/2019 | Son | B60R 21/233 |
| 2019/0111885 A1* | 4/2019 | Hwangbo | B60R 21/2338 |
| 2019/0143928 A1* | 5/2019 | Raikar | B60R 21/0132 |
| | | | 280/730.1 |

OTHER PUBLICATIONS

Non-Final Office Action dated Aug. 16, 2019, issued in U.S. Appl. No. 15/838,330.

Notice of Allowance dated Sep. 18, 2019, issued in U.S. Appl. No. 15/838,174.

\* cited by examiner

ROOF AIRBAG APPARATUS

CROSS-REFERENCE TO RELATED APPLICATION

This application claims priority from and the benefit of Korean Patent Application No. 10-2016-0168988, filed on Dec. 12, 2016, which is hereby incorporated by reference for all purposes as is set forth herein.

BACKGROUND

Field

Exemplary embodiments of the present disclosure relate to a roof airbag apparatus, and more particularly, to a roof airbag apparatus capable of preventing a roof airbag cushion from being caught by a roof frame at an initial deployment stage of the roof airbag cushion.

Discussion of the Background

In general, a vehicle carries occupants. An airbag apparatus is installed in the vehicle for the safety of a driver or a passenger. A roof airbag apparatus is installed on a panorama roof which is positioned on the roof of the vehicle. A roof airbag cushion is installed in a folded state at one end of a roof frame. The roof frame is installed to traverse the panorama roof in a width direction to suppress the panorama roof from being crumbled upon a rollover of the vehicle. The loop frame should be necessarily installed in accordance with safety regulations. Such a roof airbag apparatus is inflated and deployed upon a rollover of the vehicle and thereby prevents injury to or outward spilling of the driver or the passenger.

However, in the conventional art, it is difficult to predict whether the roof airbag cushion is to be deployed upward or downward of the panorama roof at an initial deployment stage. In the case where the distal end portion of the roof airbag cushion is rolled up upward of the panorama roof (in an outboard direction) at the initial deployment stage of the roof airbag cushion, the roof airbag cushion may not be deployed as the distal end portion of the roof airbag cushion is caught by the roof frame.

A background art of the present disclosure is disclosed in Korean Unexamined Patent Publication No. 2003-0063738 (published on Jul. 31, 2003 and entitled 'Roof airbag for automobile').

The above information disclosed in this Background section is only for enhancement of understanding of the background of the invention and, therefore, it may contain information that does not constitute prior art.

SUMMARY

Exemplary embodiments of the invention are directed to a roof airbag apparatus capable of preventing a roof airbag cushion from being caught by a roof frame at an initial deployment stage of the roof airbag cushion.

In an embodiment, a roof airbag apparatus may include: a roof airbag cushion connected to an inflator, the roof airbag cushion configured to be disposed in a first folded state in a panorama roof, and to be inflated in a second expanded state and deployed as gas is supplied from the inflator; and a constraint connected to the roof airbag cushion configured to pull downward a distal end portion of the roof airbag cushion as it is being inflated to prevent reverse deployment of the roof airbag cushion.

The constraint is configured to be separated by expansion pressure of the roof airbag cushion as the roof airbag cushion is inflated and deployed into its second expanded state.

The constraint may include: a first part fastened to the panorama roof; and a second part connected to the roof airbag cushion, the second part being initially joined with the first part by a connector, and configured to be separated from the first part by the expansion pressure of the roof airbag cushion.

The second part may be connected to the distal end portion of the roof airbag cushion.

The roof airbag cushion includes: a leading part configured to be inflated and deployed by the gas supplied from the inflator; and a trailing part connected with the leading part, and configured to be inflated and deployed a predetermined time interval after the leading part is deployed.

The leading part includes: a first chamber portion configured to be deployed toward both sides from a gas introduction part; a second chamber portion connected with the first chamber portion, and configured to be deployed from the first chamber portion in a direction opposite to the gas introduction part; a third chamber portion connected with the second chamber portion, configured to be deployed from the second chamber portion in a direction facing the gas introduction part, and disposed inside the second chamber portion; and a fourth chamber portion connected with the third chamber portion, configured to be deployed from the third chamber portion in the direction opposite to the gas introduction part, and disposed inside the third chamber portion.

The roof airbag cushion includes a first inactive portion that partitions the first chamber portion, the second chamber portion, and the third chamber portion from one another.

The first inactive portion is formed in a "U" shape, a center portion of the first inactive portion is configured to guide a deployment direction of the first chamber portion in a width direction of a vehicle, and the roof airbag cushion further includes extendable end portions configured to extend by being bent from the center portion of the first inactive portion partition, the second chamber portion, and the third chamber portion, in the width direction of the vehicle.

The trailing part includes: a fifth chamber portion connected with the fourth chamber portion, and configured to be deployed toward both sides from the fourth chamber portion; a sixth chamber portion connected with the fifth chamber portion, and configured to be deployed from the fifth chamber portion in the direction opposite to the gas introduction part; a seventh chamber portion connected with the sixth chamber portion, configured to be deployed from the sixth chamber portion in a direction opposite to a deployment direction of the fifth chamber portion, and disposed substantially parallel to the fifth chamber portion; and an eighth chamber portion connected with the seventh chamber portion, configured to be deployed from the seventh chamber portion toward the gas introduction part, and disposed inside the sixth chamber portion.

The eighth chamber portion has a plurality of branched portions extending from the seventh chamber portion toward gas introduction part.

The constraint includes a reverse deployment prevention tether.

The connector includes a stitched portion.

According to the embodiments, since reverse deployment prevention tether pulls downward the distal end portion of a roof airbag cushion at an initial deployment stage of the roof airbag cushion, it is possible to prevent the distal end portion of the roof airbag cushion from being caught by a roof frame.

Also, according to the embodiments, since the reverse deployment prevention tether is divided by the expansion pressure of the roof airbag cushion, the roof airbag cushion may be smoothly deployed with the distal end portion of the roof airbag cushion freed from the roof frame.

It is to be understood that the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention is may, however, be embodied in many different forms and should not be construed as limited to the embodiments set forth herein. Rather, these embodiments are provided so that this disclosure is thorough, and will fully convey the scope of the invention to those skilled in the art.

Hereinafter, a roof airbag apparatus will be described below with reference to the accompanying drawings through various examples of embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
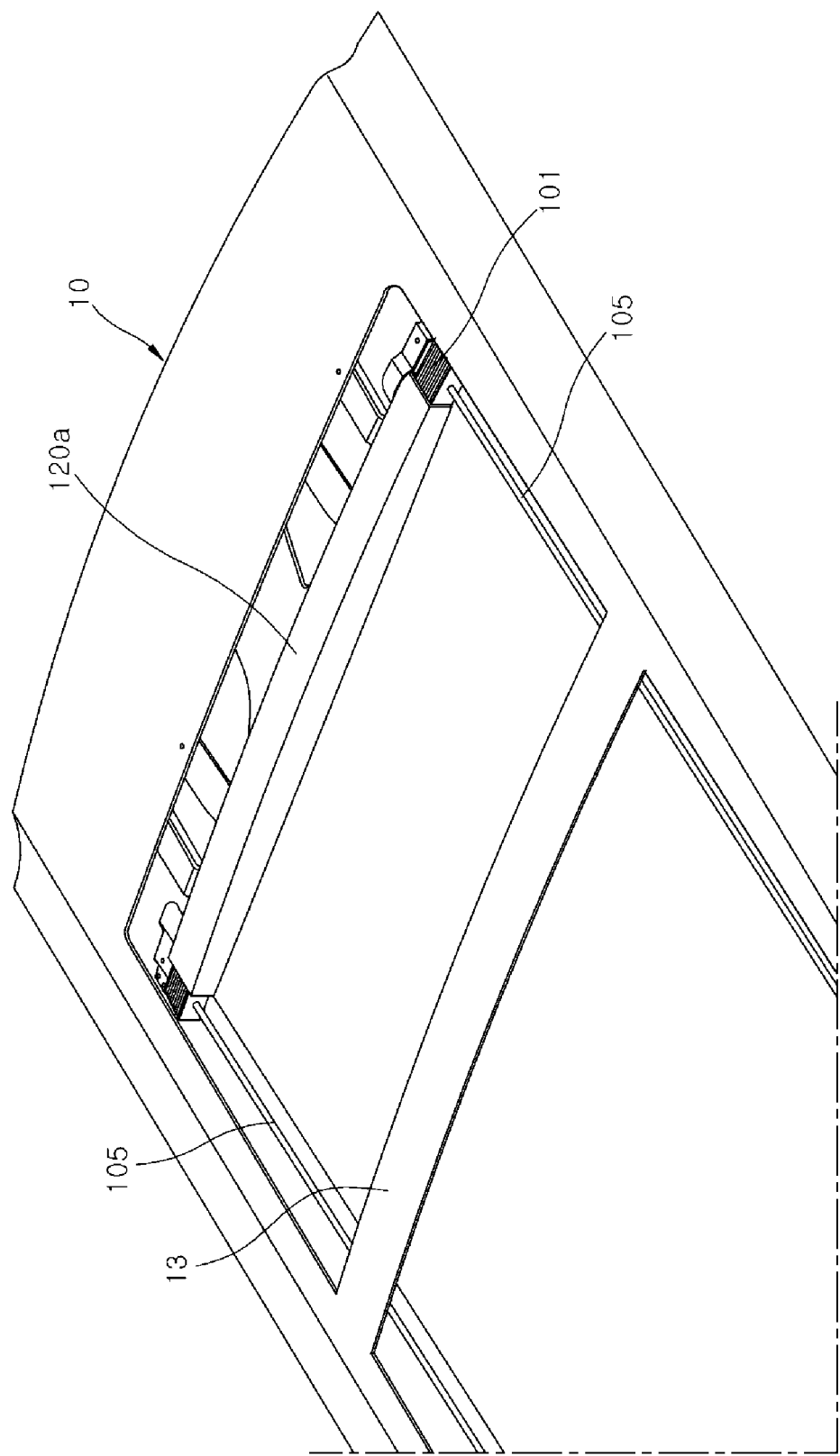
FIG. 1 is a perspective view illustrating a state in which a roof airbag apparatus in accordance with an embodiment of the present disclosure is installed on a panorama roof.
Figure 2:
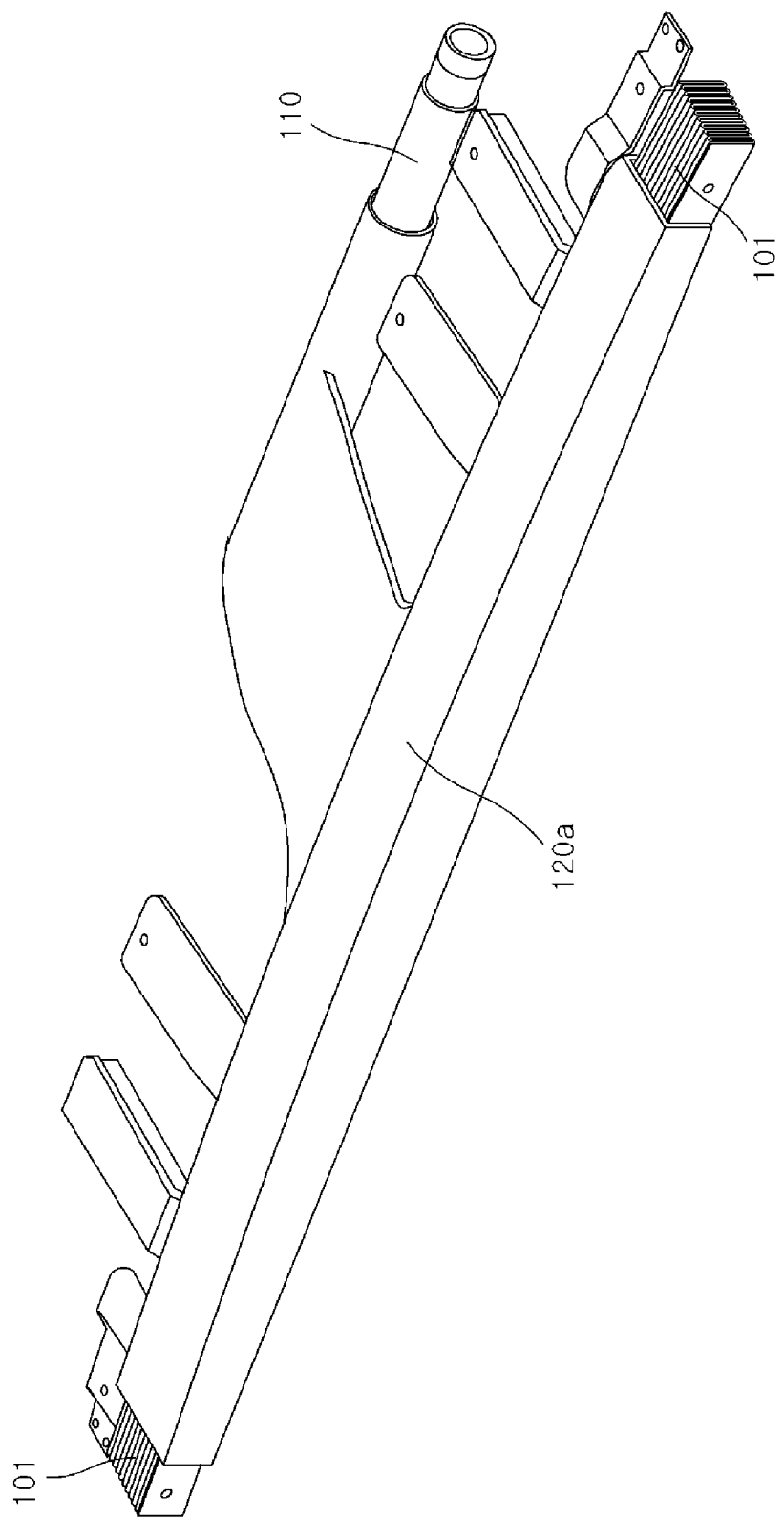
FIG. 2 is a perspective view illustrating the roof airbag apparatus in accordance with the embodiment of the present disclosure.
Figure 3:
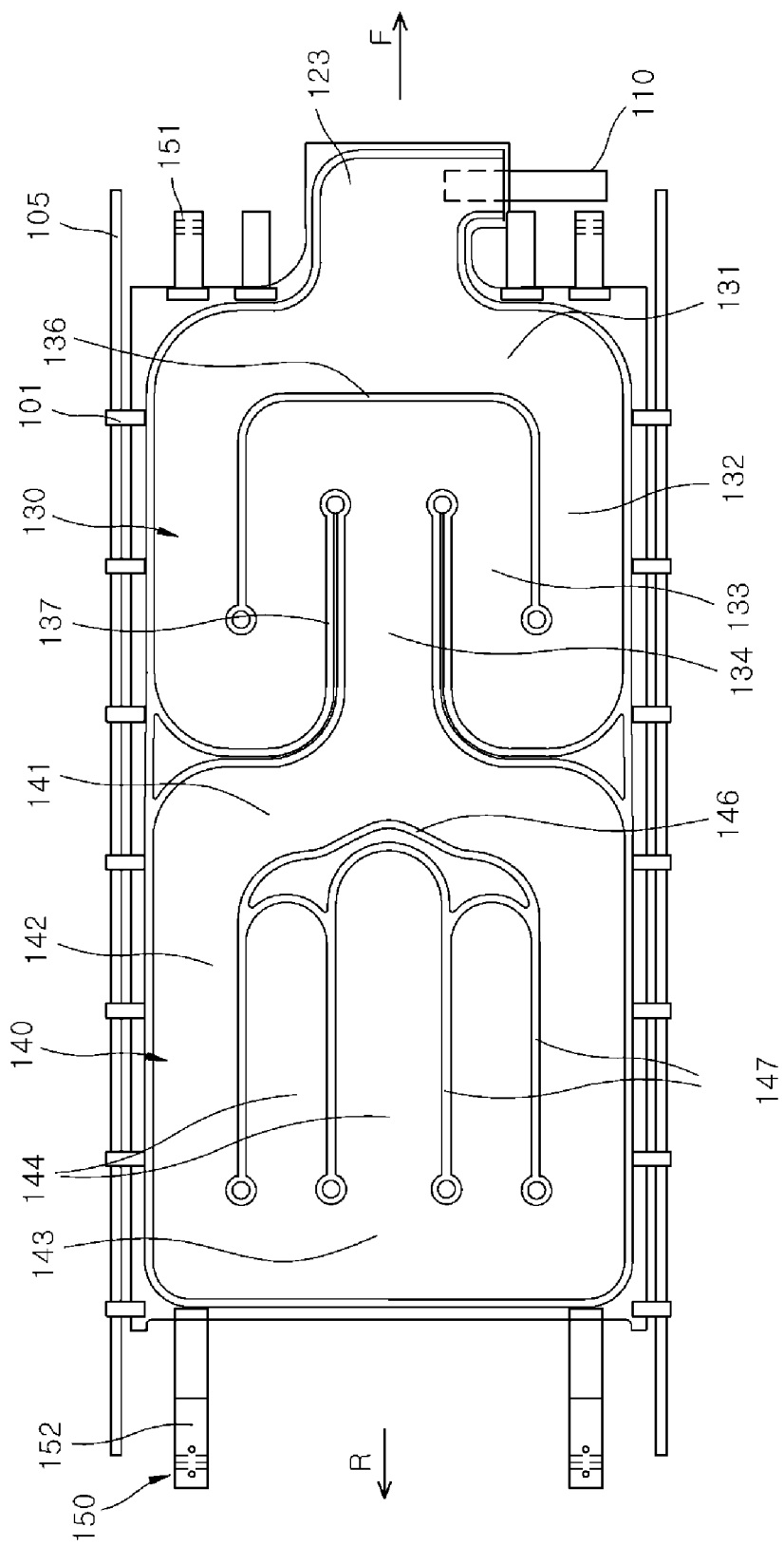
FIG. 3 is a plan view illustrating a state in which a roof airbag cushion of the roof airbag apparatus in accordance with the embodiment of the present disclosure is deployed.
Figure 4:
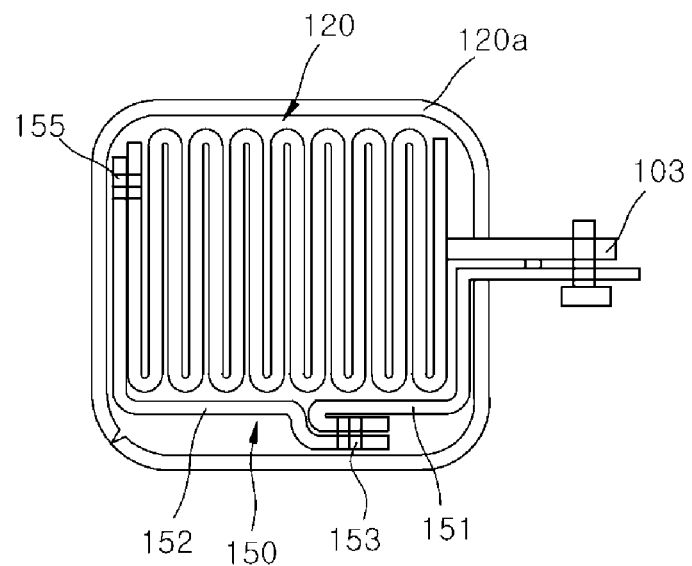
FIG. 4 is a side view illustrating a state in which the roof airbag cushion of the roof airbag apparatus in accordance with the embodiment of the present disclosure is folded zigzag.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be FIG. 1 is a perspective view illustrating a state in which a roof airbag apparatus in accordance with an embodiment of the present disclosure is installed on a panorama roof, FIG. 2 is a perspective view illustrating the roof airbag apparatus in accordance with the embodiment of the present disclosure, FIG. 3 is a plan view illustrating a state in which a roof airbag cushion of the roof airbag apparatus in accordance with the embodiment of the present disclosure is deployed, and FIG. 4 is a side view illustrating a state in which the roof airbag cushion of the roof airbag apparatus in accordance with the embodiment of the present disclosure is folded zigzag.

Referring to FIGS. 1 to 4, the roof airbag apparatus in accordance with the embodiment of the present disclosure includes a roof airbag cushion 120 and a reverse deployment prevention tether 150.

A panorama roof 10 is installed on the roof of a vehicle, and a roof frame 13 is installed to traverse the panorama roof 10 in a width direction. The roof airbag apparatus is installed on the panorama roof 10. An inflator 110 is installed at one end of the panorama roof 10. Guide parts 105 are installed along the front-rear direction of the vehicle on both sides of the panorama roof 10. As the guide parts 105, wires which are disposed parallel to each other on both sides of the roof frame 13 may be applied.

The roof airbag cushion 120 is connected to the inflator 110, and is disposed in a folded state at one end of the panorama roof 10. The roof airbag cushion 120 in the folded state is installed on the roof frame 13 in a shape in which it is surrounded by a cover 120a.

The roof airbag cushion 120 is folded in a zigzag type, and the cover 120a is installed to surround the roof airbag cushion 120 in the folded state. A gas introduction part 123 of the roof airbag cushion 120 is connected to the inflator 110.

A plurality of connection tabs 101 are installed on both sides of the roof airbag cushion 120. The plurality of connection tabs 101 are movably installed on the guide parts 105. In the case where the roof airbag cushion 120 is disposed in the folded state at one end of the panorama roof 10, the plurality of connection tabs 101 are closely contacted in lines on the guide parts 105. In the case where the roof airbag cushion 120 is deployed, the connection tabs 101 support both sides of the roof airbag cushion 120 while moving along the guide parts 105.

The reverse deployment prevention tether 150 is connected to the roof airbag cushion 120 in such a way as to pull the distal end portion (the left end portion in FIG. 4) of the roof airbag cushion 120 downward of the vehicle (in an inboard direction) when the folded roof airbag cushion 120 is inflated and deployed. Therefore, because the distal end portion of the roof airbag cushion 120 is prevented from being rolled up upward at an initial deployment stage of the roof airbag cushion 120, it is possible to prevent the distal end portion of the roof airbag cushion 120 from being caught by the roof frame 13. Furthermore, it is possible to prevent the roof airbag cushion 120 from being not deployed or from being interfered with by center pillars (not shown) disposed on both sides of the vehicle.

Figure 5:
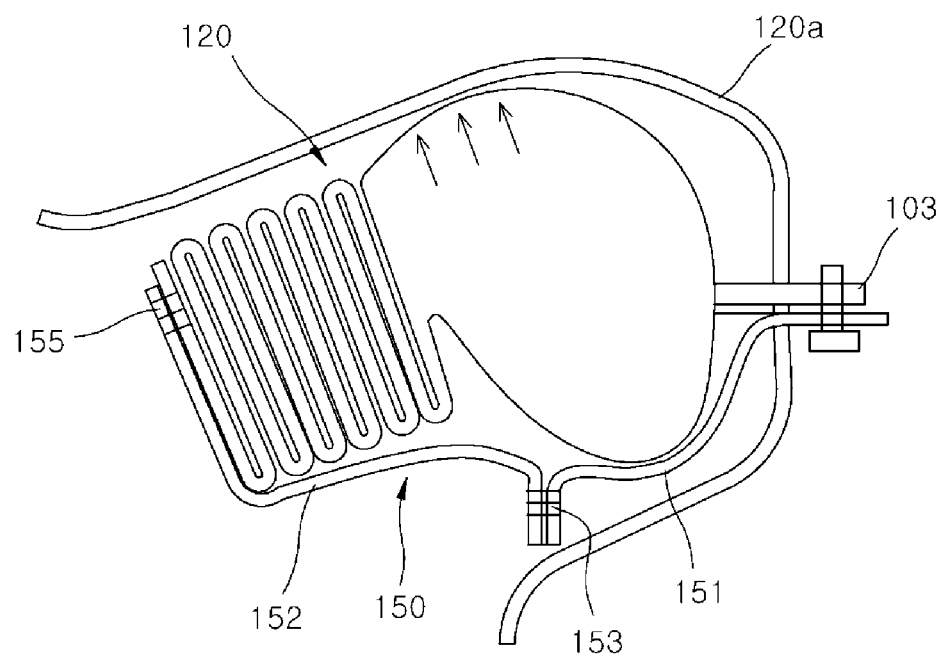
FIG. 5 is a side view illustrating a state in which a cover is opened as the roof airbag cushion of the roof airbag apparatus in accordance with the embodiment of the present disclosure is deployed.
Figure 6:
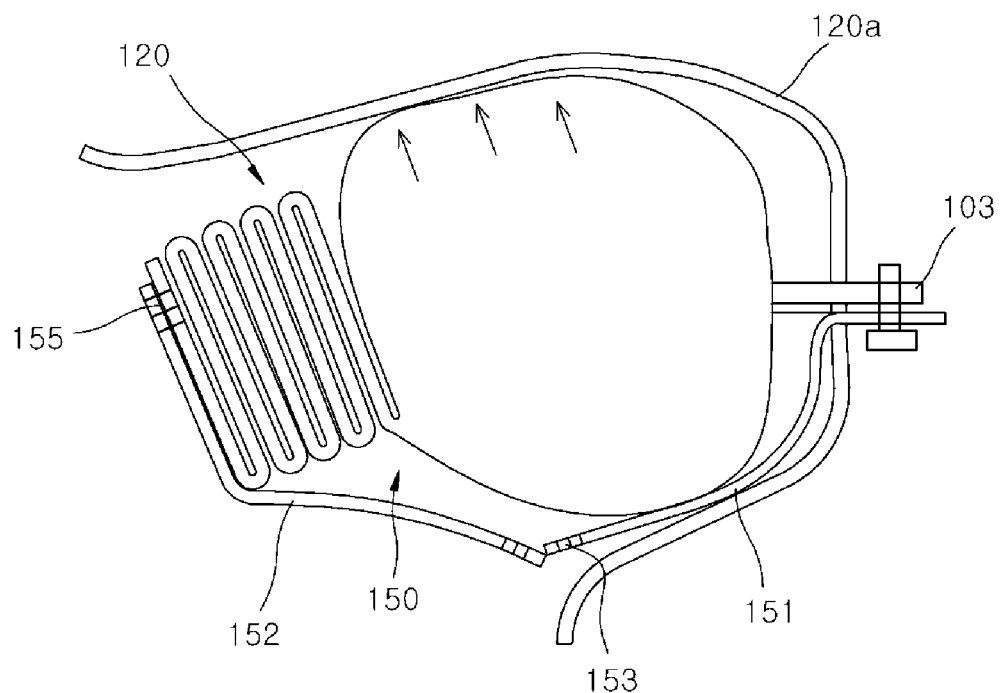
FIG. 6 is a side view illustrating a state in which a stitched portion is divided as the roof airbag cushion of the roof airbag apparatus in accordance with the embodiment of the present disclosure is deployed.

The reverse deployment prevention tether 150 is divided by the expansion pressure of the roof airbag cushion 120 when the roof airbag cushion 120 is inflated and deployed. Since, as shown in FIGS. 5 and 6, the reverse deployment prevention tether 150 pulls the roof airbag cushion 120 toward an indoor space (in the inboard direction) until it is divided, it prevents the distal end portion of the roof airbag cushion 120 from being rolled up upward. If the reverse deployment prevention tether 150 is divided by the expansion pressure of the roof airbag cushion 120, the roof airbag cushion 120 is not restrained any more by the reverse deployment prevention tether 150.

The reverse deployment prevention tether 150 is formed to have a length that allows the reverse deployment prevention tether 150 to be divided after the distal end portion of the roof airbag cushion 120 passes the roof frame 13. Thus, after the distal end portion of the roof airbag cushion 120 passes the roof frame 13, the roof frame 13 cannot disturb the inflation and deployment of the roof airbag cushion 120.

The dividing of the reverse deployment prevention tether 150 means that the reverse deployment prevention tether 150 snaps off or is freed from restriction by the expansion pressure of the roof airbag cushion 120 or a cutting device. The following descriptions will be made with reference to an example in which the reverse deployment prevention tether 150 snaps off.

The reverse deployment prevention tether 150 includes a first reverse deployment prevention tether part 151 and a second reverse deployment prevention tether part 152. The first reverse deployment prevention tether part 151 is fastened to the panorama roof 10, specifically, a fastening tab 103, by a locking member. The second reverse deployment prevention tether part 152 is connected to the roof airbag cushion 120, is provisionally joined with the first reverse deployment prevention tether part 151 by a stitched portion 153, and is separated from the first reverse deployment prevention tether part 151 if the expansion pressure of the roof airbag cushion 120 exceeds a set value. The stitched portion 153 provisionally joins the first reverse deployment prevention tether part 151 and the second reverse deployment prevention tether part 152 such that the stitched portion 153 may be unstitched when the set expansion pressure is applied.

The second reverse deployment prevention tether part 152 is connected to the distal end portion of the roof airbag cushion 120. Since the second reverse deployment prevention tether part 152 is connected to the distal end portion of the roof airbag cushion 120, the distal end portion of the roof airbag cushion 120 is pulled downward (in the inboard direction) when the roof airbag cushion 120 is inflated, and is thereby prevented from being caught by the roof frame 13.

The roof airbag cushion 120 includes a leading deployment part 130 and a trailing deployment part 140. In the roof airbag cushion 120, the trailing deployment part 140 is deployed after the leading deployment part 130 is deployed. The distal end portion of the leading deployment part 130 may be disposed at a position corresponding to the roof frame 13.

The leading deployment part 130 includes a first chamber portion 131, a second chamber portion 132, a third chamber portion 133, and a fourth chamber portion 134.

The first chamber portion 131 is deployed toward both sides from the gas introduction part 123. The first chamber portion 131 is deployed in parallel with the width direction of the panorama roof 10.

The second chamber portion 132 is connected with the first chamber portion 131, and is deployed from the first chamber portion 131 in a direction opposite to the gas introduction part 123, that is, toward the rear of the vehicle. The second chamber portion 132 is deployed substantially perpendicularly to the first chamber portion 131, and forms the outermost portion of the leading deployment part 130.

The third chamber portion 133 is connected with the second chamber portion 132, and is deployed from the second chamber portion 132 in a direction facing the gas introduction part 123, that is, toward the front of the vehicle. The third chamber portion 133 is disposed inside the second chamber portion 132. The third chamber portion 133 is expanded in a direction opposite to the expanding direction of the second chamber portion 132, and is disposed inside the second chamber portion 132.

The fourth chamber portion 134 is connected with the third chamber portion 133, and is deployed from the third chamber portion 133 in the direction opposite to the gas introduction part 123. The fourth chamber portion 134 is disposed between portions of the third chamber portion 133. The first chamber portion 131, the second chamber portion 132, the third chamber portion 133, and the fourth chamber portion 134 which form the leading deployment part 130 are sequentially inflated and deployed.

The third chamber portion 133 is partitioned from the first chamber portion 131 and the second chamber portion 132 by a first inactive portion 136 of a substantially "U" shape. The third chamber portion 133 and the fourth chamber portion 134 are partitioned from each other by a second inactive portion 137.

After the first chamber portion 131 and the second chamber portion 132 which are disposed at the periphery of the leading deployment part 130 are deployed, the third chamber portion 133 and the fourth chamber portion 134 which are positioned inside the first chamber portion 131 and the second chamber portion 132 are deployed. As the second chamber portion 132 is deployed, the connection tabs 101 which are attached to the sides of the leading deployment part 130 are moved rearward along the guide parts 105. Therefore, the deployment of the third chamber portion 133 toward the front of the vehicle may be smoothly implemented.

The trailing deployment part 140 includes a fifth chamber portion 141, a sixth chamber portion 142, a seventh chamber portion 143 and an eighth chamber portion 144.

The fifth chamber portion 141 is connected with the fourth chamber portion 134, and a pair of portions which constitute the fifth chamber portion 141 are deployed from the fourth chamber portion 134 in the width direction of the vehicle. The fifth chamber portion 141 is disposed in parallel with the first chamber portion 131.

The sixth chamber portion 142 is connected with the fifth chamber portion 141, and is deployed from the fifth chamber portion 141 in the direction opposite to the gas introduction part 123. The sixth chamber portion 142 forms the outermost portion of the trailing deployment part 140.

The seventh chamber portion 143 is connected with the sixth chamber portion 142, and forms the distal end portion of the roof airbag cushion 120. The seventh chamber portion 143 is deployed in a direction opposite to the deployment direction of the fifth chamber portion 141. That is to say, if the fifth chamber portion 141 is deployed in a direction diverging outward, the seventh chamber portion 143 is deployed in a direction converging inward. After deployment, the seventh chamber portion 143 is disposed in parallel with the fifth chamber portion 141 and the first chamber portion 131.

The eighth chamber portion 144 is deployed from the seventh chamber portion 143 toward the gas introduction part 123, and is disposed inside the sixth chamber portion 142. As the eighth chamber portion 144, a plurality of portions are branched from the seventh chamber portion 143 toward the gas introduction part 123. The fifth chamber portion 141, the sixth chamber portion 142, the seventh chamber portion 143, and the seventh chamber portion 144 which form the trailing deployment part 140 are sequentially inflated and deployed.

The eighth chamber portion 144 is partitioned from the fifth chamber portion 141 and the sixth chamber portion 142 by a third inactive portion 146 of a substantially "U" shape. The plurality of portions of the eighth chamber portion 144 are partitioned from one another by a fourth inactive portion 147.

After the fifth chamber portion 141, the sixth chamber portion 142 and the seventh chamber portion 143 which form the periphery of the trailing deployment part 140 are deployed, the eighth chamber portion 144 is deployed. As the sixth chamber portion 142 is deployed, the connection tabs 101 which are attached to the sides of the trailing deployment part 140 are moved rearward along the guide parts 105. Since the sixth chamber portion 142 is deployed, the deployment of the trailing deployment part 140 may be smoothly implemented. Therefore, as the deployment of the eighth chamber portion 144 toward the front of the vehicle is smoothly implemented, the deployment of the entire trailing deployment part 140 is smoothly implemented as well.

The deployment process of the roof airbag apparatus in accordance with the embodiment of the present disclosure, constructed as mentioned above, will be described below.

Figure 7:
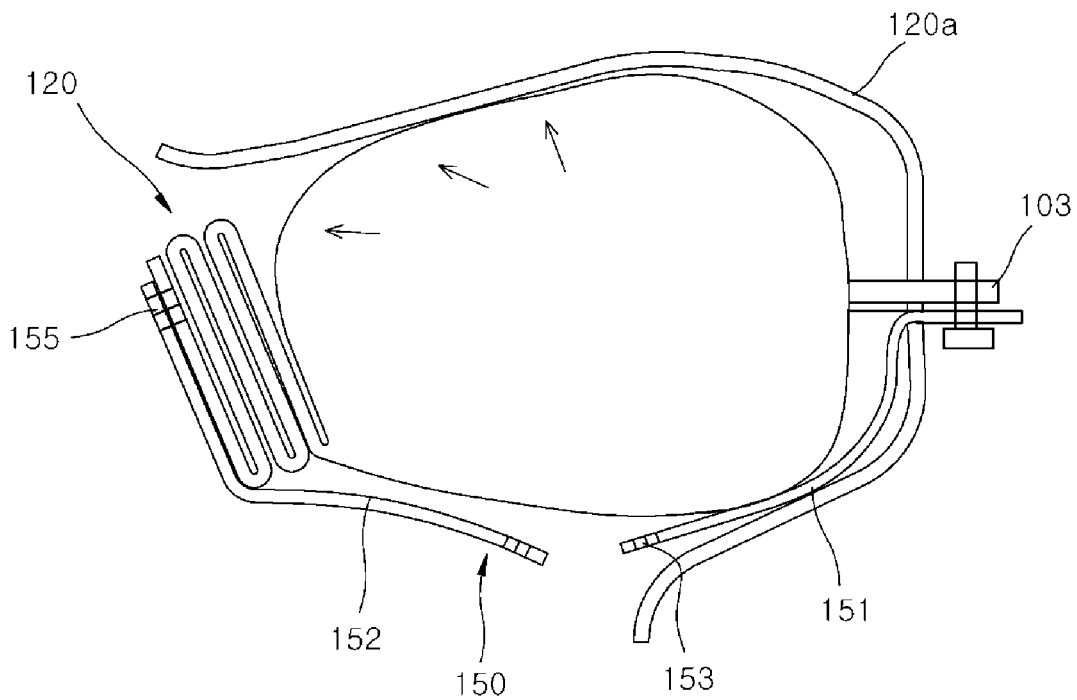
FIG. 7 is a side view illustrating a state in which the roof airbag cushion is deployed after the stitched portion is divided, in the roof airbag apparatus in accordance with the embodiment of the present disclosure.
Figure 8A:
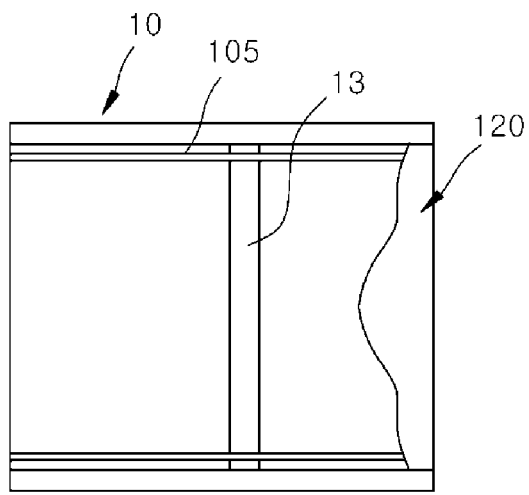
FIGS. 8A to 8F are views illustrating a process in which the roof airbag cushion is deployed in the roof airbag apparatus in accordance with the embodiment of the present disclosure.
Figure 8B:
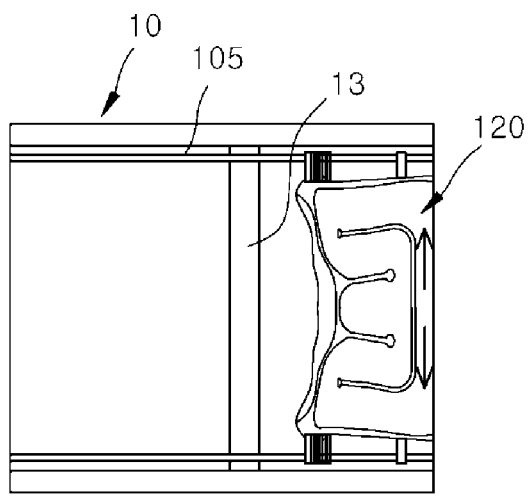
Figure 8C:
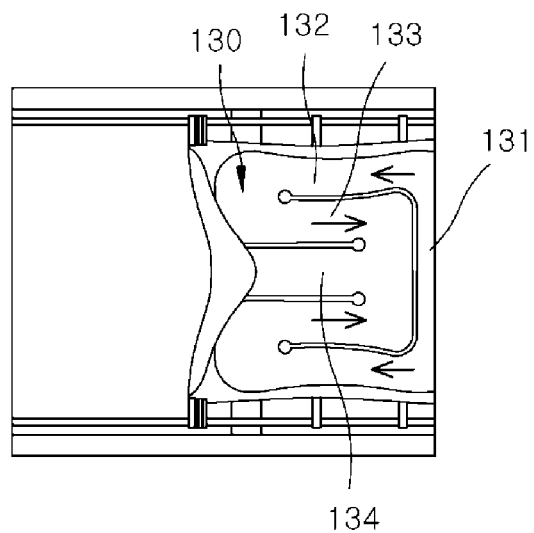
Figure 8D:
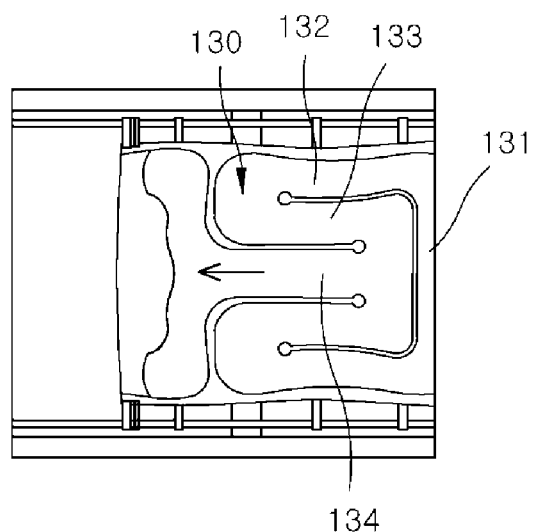
Figure 8E:
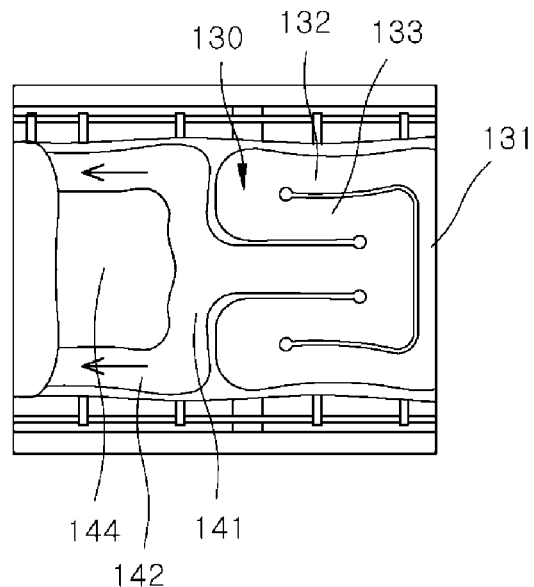
Figure 8F:
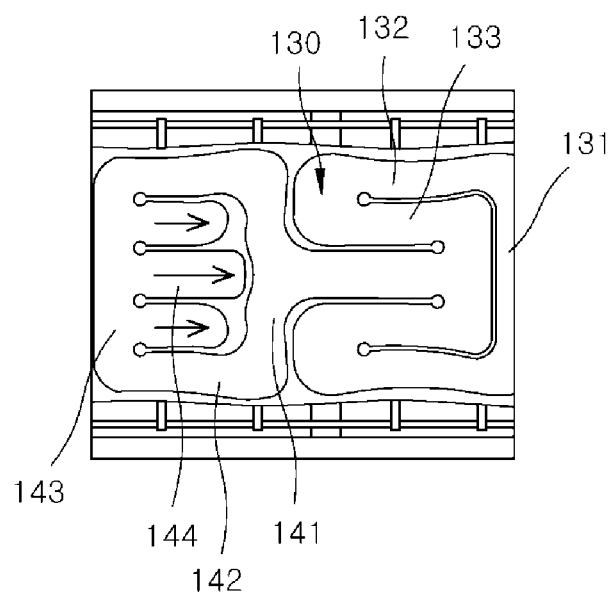

FIG. 5 is a side view illustrating a state in which a cover is opened as the roof airbag cushion of the roof airbag apparatus in accordance with the embodiment of the present disclosure is deployed, FIG. 6 is a side view illustrating a state in which a stitched portion is divided as the roof airbag cushion of the roof airbag apparatus in accordance with the embodiment of the present disclosure is deployed, FIG. 7 is a side view illustrating a state in which the roof airbag cushion is deployed after the stitched portion is divided, in the roof airbag apparatus in accordance with the embodiment of the present disclosure, and FIGS. 8A to 8F are views illustrating a process in which the roof airbag cushion is deployed in the roof airbag apparatus in accordance with the embodiment of the present disclosure.

Referring to FIGS. 5, 6, 7 and 8A to 8F, upon a rollover of the vehicle, as the inflator 110 is driven, the gas of the inflator 110 is introduced into the gas introduction part 123. As the gas of the gas introduction part 123 flows in the first chamber portion 131, the first chamber portion 131 is inflated and deployed in the width direction of the panorama roof 10. As the gas of the first chamber portion 131 flows into the second chamber portion 132, the second chamber portion 132 is inflated and deployed. As the second chamber portion 132 is deployed, the connection tabs 101 are moved along the guide parts 105. As the first chamber portion 131 and the second chamber portion 132 are inflated, the cover 120a which surrounds the folded roof airbag cushion 120 snaps off and is opened.

As the gas of the second chamber portion 132 flows into the third chamber portion 133 and the fourth chamber portion 134, the third chamber portion 133 and the fourth chamber portion 134 are inflated and deployed. At this time, as the reverse deployment prevention tether 150 is tightened, since the distal end portion of the roof airbag cushion 120 is pulled downward by the reverse deployment prevention tether 150, it is possible to prevent the distal end portion of the roof airbag cushion 120 from being rolled up upward. Therefore, it is possible to prevent the distal end portion of the roof airbag cushion 120 from being not deployed by being caught by the roof frame 13.

As the third chamber portion 133 and the fourth chamber portion 134 are inflated and deployed, the expansion pressure of the roof airbag cushion 120 is applied to the reverse deployment prevention tether 150. If the expansion pressure of the roof airbag cushion 120 exceeds the set value, the stitched portion 153 of the reverse deployment prevention tether 150 is unstitched. As the stitched portion 153 is unstitched, the first reverse deployment prevention tether part 151 and the second reverse deployment prevention tether part 152 are separated from each other.

At this time, since the distal end portion of the roof airbag cushion 120 is out of the area where it may be caught by the roof frame 13, that is, the distal end portion of the roof airbag cushion 120 has passed the roof frame 13 below the roof frame 13, it is possible to prevent the occurrence of a situation in which the roof airbag cushion 120 is not deployed by being caught by the roof frame 13.

As gas flows into the fifth chamber portion 141, the sixth chamber portion 142 and the seventh chamber portion 143, the fifth chamber portion 141, the sixth chamber portion 142, and the seventh chamber portion 143 are sequentially inflated and deployed. As the sixth chamber portion 142 is inflated, the connection tabs 101 are moved along the guide parts 105.

Since the fifth chamber portion 141, the sixth chamber portion 142 and the seventh chamber portion 143 surround the outside of the trailing deployment part 140, the eighth chamber portion 144 may be easily deployed.

As described above, since the reverse deployment prevention tether 150 pulls downward the distal end portion of the roof airbag cushion 120 at an initial deployment stage of the roof airbag cushion 120, it is possible to prevent the distal end portion of the roof airbag cushion 120 from being caught by the roof frame 13.

Moreover, since the reverse deployment prevention tether 150 is divided by the expansion pressure of the roof airbag cushion 120, the distal end portion of the roof airbag cushion 120 may be smoothly deployed with the distal end portion of the roof airbag cushion 120 freed from the roof frame 13.

Although preferred embodiments of the disclosure have been disclosed for illustrative purposes, those skilled in the art will appreciate that various modifications, additions, and substitutions are possible, without departing from the scope and spirit of the disclosure as defined in the accompanying claims. Thus, the true technical scope of the disclosure should be defined by the following claims.

What is claimed is:
1. A roof airbag apparatus comprising:
   a roof airbag cushion connected to an inflator, the roof airbag cushion configured to be disposed in a first folded state in a panorama roof, and to be inflated in a second expanded state and deployed as gas is supplied from the inflator; and a constraint connected to the roof airbag cushion configured to pull downward a distal end portion of the roof airbag cushion as it is being inflated to prevent reverse deployment of the roof airbag cushion, wherein:

the roof airbag cushion comprises a leading part configured to be inflated and deployed by the gas supplied from the inflator; and the leading part comprises:
- a first chamber portion configured to be deployed toward both sides from a gas introduction part;
- a second chamber portion connected with the first chamber portion, and configured to be deployed from the first chamber portion in a direction opposite to the gas introduction part;
- a third chamber portion connected with the second chamber portion, configured to be deployed from the second chamber portion in a direction facing the gas introduction part, and disposed inside the second chamber portion; and
- a fourth chamber portion connected with the third chamber portion, configured to be deployed from the third chamber portion in the direction opposite to the gas introduction part, and disposed inside the third chamber portion.

2. The roof airbag apparatus according to claim 1, wherein the roof airbag cushion comprises:
a trailing part connected with the leading part, and configured to be inflated and deployed a predetermined time interval after the leading part is deployed.

3. The roof airbag apparatus according to claim 1, wherein the constraint comprises a reverse deployment prevention tether.

4. The roof airbag apparatus according to claim 1, wherein the roof airbag cushion comprises a first inactive portion that partitions the first chamber portion, the second chamber portion, and the third chamber portion from one another.

5. The roof airbag apparatus according to claim 4,
wherein the first inactive portion is formed in a "U" shape,
wherein a center portion of the first inactive portion is configured to guide a deployment direction of the first chamber portion in a width direction of a vehicle, and
wherein the roof airbag cushion further comprises extendable end portions configured to extend by being bent from the center portion of the first inactive portion partition, the second chamber portion, and the third chamber portion, in the width direction of the vehicle.

6. The roof airbag apparatus according to claim 2, wherein the trailing part comprises:
- a fifth chamber portion connected with the fourth chamber portion, and configured to be deployed toward both sides from the fourth chamber portion;
- a sixth chamber portion connected with the fifth chamber portion, and configured to be deployed from the fifth chamber portion in the direction opposite to the gas introduction part;
- a seventh chamber portion connected with the sixth chamber portion, configured to be deployed from the sixth chamber portion in a direction opposite to a deployment direction of the fifth chamber portion, and disposed substantially parallel to the fifth chamber portion; and
- an eighth chamber portion connected with the seventh chamber portion, configured to be deployed from the seventh chamber portion toward the gas introduction part, and disposed inside the sixth chamber portion.

7. The roof airbag apparatus according to claim 6, wherein the eighth chamber portion has a plurality of branched portions extending from the seventh chamber portion toward the gas introduction part.

8. The roof airbag apparatus according to claim 1, wherein the constraint is configured to be separated by expansion pressure of the roof airbag cushion as the roof airbag cushion is inflated and deployed into the second expanded state.

9. The roof airbag apparatus according to claim 8, wherein the constraint comprises:
a first part fastened to the panorama roof; and
a second part connected to the roof airbag cushion, the second part being initially joined with the first part by a connector, and configured to be separated from the first part by the expansion pressure of the roof airbag cushion.

10. The roof airbag apparatus according to claim 9, wherein the second part is connected to the distal end portion of the roof airbag cushion.

11. The roof airbag apparatus according to claim 9, wherein the connector comprises a stitched portion.

* * * * *